US012501091B2

(12) United States Patent
Lenhart et al.

(10) Patent No.: US 12,501,091 B2
(45) Date of Patent: *Dec. 16, 2025

(54) SYSTEMS AND METHODS FOR OPTIMIZING CONTENT VIEWING USING DIGITAL RIGHTS OF MULTIPLE USERS

(71) Applicant: Adeia Guides Inc., San Jose, CA (US)

(72) Inventors: Kevin Bruce Lenhart, Campbell, CA (US); Sean Matthews, Los Altos, CA (US); Benjamin Holms Maughan, Pleasanton, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/204,489

(22) Filed: Jun. 1, 2023

(65) Prior Publication Data

US 2023/0353804 A1 Nov. 2, 2023

Related U.S. Application Data

(63) Continuation of application No. 17/097,933, filed on Nov. 13, 2020, now Pat. No. 11,711,559, which is a
(Continued)

(51) Int. Cl.
| | | |
|---|---|---|
| *H04N 21/4627* | (2011.01) | |
| *H04N 21/254* | (2011.01) | |
| *H04N 21/2543* | (2011.01) | |
| *H04N 21/258* | (2011.01) | |
| *H04N 21/472* | (2011.01) | |
| *H04N 21/232* | (2011.01) | |

(52) U.S. Cl.
CPC ..... *H04N 21/2541* (2013.01); *H04N 21/2543* (2013.01); *H04N 21/25875* (2013.01); *H04N 21/4627* (2013.01); *H04N 21/47202* (2013.01); *H04N 21/47211* (2013.01); *H04N 21/232* (2013.01)

(58) Field of Classification Search
CPC ....... H04N 21/47202; H04N 21/47211; H04N 21/2541; H04N 21/2543; H04N 21/232; H04N 21/25875
See application file for complete search history.

(56) References Cited

U.S. PATENT DOCUMENTS 6,239,794 B1 5/2001 Yuen et al.
6,564,378 B1 5/2003 Satterfield et al.
(Continued)

*Primary Examiner* — Pinkal R Chokshi
(74) *Attorney, Agent, or Firm* — HALEY GUILIANO LLP

(57) ABSTRACT

Systems and methods are disclosed herein for enabling multiple users' digital rights to be applied as needed to access media while those users are present to consume media. In particular, a media guidance application may receive a selection of a media asset and determine that the user equipment device does not allow access to the media asset. In response, the media guidance application may identify all the users consuming content from that user equipment device and retrieve digital rights for each user. The media guidance application may compare the digital rights of each user with digital rights required to access the media asset. The media guidance application may, based on the comparison, identify a set of digital rights (e.g., for another user present) that enable access to the media asset, and use those digital rights to access the media asset for consumption.

20 Claims, 7 Drawing Sheets

Related U.S. Application Data continuation of application No. 15/961,232, filed on Apr. 24, 2018, now Pat. No. 10,869,074.

(56) References Cited

U.S. PATENT DOCUMENTS

| | | | |
|---|---|---|---|
| 7,165,098 B1 | 1/2007 | Boyer et al. | |
| 7,444,413 B2* | 10/2008 | Saxena | H04N 7/165 |
| | | | 709/212 |
| 7,761,892 B2 | 7/2010 | Ellis et al. | |
| 8,046,801 B2 | 10/2011 | Ellis et al. | |
| 9,591,339 B1 | 3/2017 | Christie et al. | |
| 10,045,090 B2* | 8/2018 | Kareeson | H04N 21/4627 |
| 10,306,326 B1 | 5/2019 | Nijim | |
| 10,848,806 B2 | 11/2020 | Helms et al. | |
| 10,869,074 B2 | 12/2020 | Lenhart et al. | |
| 11,711,559 B2 | 7/2023 | Lenhart et al. | |
| 2002/0174430 A1 | 11/2002 | Ellis et al. | |
| 2004/0024886 A1 | 2/2004 | Saxena | |
| 2005/0251827 A1 | 11/2005 | Ellis et al. | |
| 2006/0168222 A1* | 7/2006 | Saxena | H04N 7/165 |
| | | | 348/E7.063 |
| 2007/0005504 A1* | 1/2007 | Chen | G06Q 30/06 |
| | | | 705/59 |
| 2009/0265426 A1 | 10/2009 | Svendsen et al. | |
| 2010/0077438 A1 | 3/2010 | Ansari | |
| 2010/0153885 A1 | 6/2010 | Yates | |
| 2010/0199341 A1 | 8/2010 | Foti et al. | |
| 2012/0134652 A1 | 5/2012 | Bhogul et al. | |
| 2012/0222061 A1 | 8/2012 | Anthru et al. | |
| 2013/0160146 A1 | 6/2013 | Kaiser et al. | |
| 2013/0174273 A1 | 7/2013 | Grab et al. | |
| 2014/0147020 A1* | 5/2014 | Baldwin | H04N 21/2541 |
| | | | 382/118 |
| 2014/0223464 A1 | 8/2014 | Moran et al. | |
| 2014/0283129 A1* | 9/2014 | Coronel | G06F 21/10 |
| | | | 726/28 |
| 2015/0012616 A1 | 1/2015 | Pearl et al. | |
| 2015/0230004 A1 | 8/2015 | Vanduyn et al. | |
| 2016/0044385 A1 | 2/2016 | Kareeson et al. | |
| 2016/0094678 A1* | 3/2016 | Kumar | H04L 65/60 |
| | | | 709/219 |
| 2016/0277785 A1 | 9/2016 | Newman et al. | |
| 2018/0103281 A1* | 4/2018 | Drake | H04N 21/4623 |
| 2019/0215564 A1* | 7/2019 | Webb | H04N 21/47202 |
| 2019/0327509 A1 | 10/2019 | Lenhart et al. | |
| 2021/0120293 A1 | 4/2021 | Lenhart et al. | |

* cited by examiner

600

602
Receive user input that identifies a media asset for consumption by a plurality of users that is consuming media content from a first user equipment device, where the first user equipment device is associated with a first user of the plurality of users

604
Determine, based on a first set of digital rights associated with the first user, that the first user does not have digital rights to access the media asset

606
In response to determining that the first user does not have the digital rights to access the media asset:

608
Determine a plurality of sets of digital rights, where each set of the plurality of sets of digital rights describes digital rights for a respective user of the plurality of users

610
Compare each set of digital rights of the plurality of sets of digital rights with digital rights required to access the media asset

612
Identify, based on the comparing, a second user of the plurality of users with a second set of digital rights of the plurality of sets of digital rights that matches the digital rights required to access the media asset

614
Access the media asset using the first user equipment device with the second set of digital rights associated with the second user

FIG. 6

SYSTEMS AND METHODS FOR OPTIMIZING CONTENT VIEWING USING DIGITAL RIGHTS OF MULTIPLE USERS

CROSS-REFERENCE TO RELATED APPLICATION

This application is a continuation of U.S. patent application Ser. No. 17/097,933, filed Nov. 13, 2020, which is a continuation of U.S. patent application Ser. No. 15/961,232, filed Apr. 24, 2018, now U.S. Pat. No. 10,869,074, which are hereby incorporated by reference herein in their entireties.

BACKGROUND

Friends and families often get together to consume media content. Whether it is the latest episode of "Game of Thrones" being viewed by a circle of friends or family members getting together to watch a movie, current systems enable users to browse media content (e.g., video on demand, over the top, and other suitable content) in order to find something to consume. However, current systems enable a single user (usually the household user) to be logged in at one time. Therefore, if the media asset to be consumed is the latest episode of "Game of Thrones" (available on Home Box Office ("HBO") network), and the household user has no access to that programming, in order to watch "Game of Thrones," the household will need to subscribe to HBO, even if a friend has that subscription already.

SUMMARY

Therefore, systems and methods are disclosed herein for enabling multiple users' digital rights to be applied as needed to access media while those users are present to consume media. A media guidance application may be configured to perform the actions for enabling multiple users' digital rights to be applied as needed to access media. In particular, the media guidance application may receive a selection of a media asset and determine that the user equipment device that is being used in combination with the household/user credentials that are being used to access the media asset do not allow for that access. In response, the media guidance application may identify all the users consuming content from that user equipment device and retrieve digital rights for each user. The media guidance application may compare the digital rights of each user with digital rights required to access the media asset. The media guidance application may, based on the comparison, identify a set of digital rights (e.g., for another user present) that enable access to the media asset, and use those digital rights to access the media asset for consumption.

In some aspects, the media guidance application may perform the following actions to enable multiple users' digital rights to be applied as needed to access media while those users are present to consume media. The media guidance application may receive user input that identifies a media asset for consumption by a plurality of users that is consuming media content from a first user equipment device, where the first user equipment device is associated with a first user of the plurality of users. For example, a number of friends may get together to watch the latest episode of "Game of Thrones" at one person's home. The person whose home it is may be subscribed to cable television and select the episode of the "Game of Thrones" from a media guidance application residing on a set-top box. The media guidance application may identify digital rights needed to access the episode of "Game of Thrones." Specifically, the media guidance application may retrieve, using a media asset identifier associated with the media asset, digital rights associated with the media asset. For example, the media guidance application may retrieve a set of digital rights required to view "Game of Thrones." Those may include subscription levels and/or group memberships of the user.

The media guidance application may identify digital rights associated with the user. Specifically, the media guidance application may retrieve, using a user identifier associated with the first user, a first set of digital rights, where the first set of digital rights includes digital rights associated with the first user. For example, the user may have a certain subscription level that includes rights to certain media assets or certain channels. Some subscription levels may have more rights than other subscription levels. In some embodiments, the rights associated with the user may be represented with groups that the user is a member of. For example, each media asset may have an associated access list that includes a list of users and groups that have access to the media asset. Furthermore, every user may have an associated list of groups that the user is a member of.

The media guidance application may compare digital rights of the user with digital rights required for the media asset. Specifically, the media guidance application may compare the first set of digital rights with digital rights required to access the media asset. For example, the media guidance application may compare the user's subscription level with subscription levels required to view the episode of "Game of Thrones." For example, in order to view the episode of "Game of Thrones" the user may need a subscription to HBO or the user may need to buy the episode (i.e., subscribe to the episode).

The media guidance application may determine that the household user/user equipment device does not have the required digital rights to access the media asset. Specifically, the media guidance application may determine, based on comparing the first set of digital rights with the digital rights required to access the media asset, that the first user does not have digital rights to access the media asset. For example, the household may not be subscribed to HBO and the user may not have purchased the episode of "Game of Thrones." The media guidance application may, as a result of comparing the subscription level of the user and subscription level(s) required to access the episode of "Game of Thrones," determine that the user's subscription level does not allow for accessing the episode.

The media guidance application may take the following actions in response to determining that the first user does not have the digital rights to access the media asset. The media guidance application may identify individuals that are present for consumption of the media asset. Specifically, the media guidance application may determine a plurality of user identifiers, where each user identifier is associated with a respective user of the plurality of users. For example, the media guidance application may determine that five different users/viewers have gotten together to watch an episode of "Game of Thrones" and retrieve the user identifiers associated with those users.

The media guidance application may retrieve digital rights associated with every user that is about to consume the media asset. Specifically, the media guidance application may retrieve, using the plurality of user identifiers, a plurality of sets of digital rights, where each set of the plurality of sets of digital rights describes digital rights for a respective user of the plurality of users. For example, the media guidance application may retrieve a subscription level that each user has for HBO which is the network that makes available the episode of "Game of Thrones."

The media guidance application may compare user subscription levels with subscription level(s) required to access the media asset. Specifically, the media guidance application may compare each set of digital rights of the plurality of sets of digital rights with the digital rights required to access the media asset. For example, the media guidance application may determine that a subscription to HBO or HBO GO" (over the top service for HBO) is required to access the episode of "Game of Thrones." Alternatively or additionally, the user may buy that episode or the whole series in order to access it. Thus, the media guidance application may compare the subscription levels of the user with the required subscription level. Alternatively or additionally, the media guidance application may compare groups that the user belongs to with groups that are allowed access to the media asset.

The media guidance application may identify one of the users that is able to access the media asset. Specifically, the media guidance application may determine, based on comparing each set of digital rights of the plurality of sets of digital rights with the digital rights required to access the media asset, whether a second set of digital rights of the plurality of sets of digital rights matches the digital rights required to access the media asset. The media guidance application may determine whether any user present has the proper subscription to access the episode of "Game of Thrones."

If the media guidance application determines that one of the users has access, the media guidance application may access and/or generate for display the media asset. Specifically, the media guidance application may, in response to determining that the second set of digital rights of the plurality of sets of digital rights matches the digital rights required to access the media asset, access the media asset using the first user equipment device with the second set of digital rights. For example, the media guidance application may generate for display the episode of "Game of Thrones."

In some embodiments, the media guidance application may set a second user as the current user while the media asset is being accessed/played. Specifically, the media guidance application may set a second user of the plurality of users as a current user, where the second user is associated with the second set of digital rights, and set the first user of the plurality of users as the current user when the media asset has finished playing. To continue with the example above, if the media guidance application determined that a second user is associated with a subscription that is to be used to access the episode of "Game of Thrones," the media guidance application may set that user as the current user on the system while the episode of "Game of Thrones" is being played or accessed.

In some embodiments, the media guidance application may retrieve, using the media asset identifier associated with the media asset, the digital rights associated with the media asset by taking the following actions. The media guidance application may transmit, to a remote server, a query for the digital rights associated with the media asset, wherein the query includes a media asset identifier associated with the media asset, and receive from the remote server a data structure that stores the digital rights required to access the media asset. For example, the media guidance application may transmit, to a remote server as part of a query for digital rights, the name "Game of Thrones," the episode number and the season of the episode that has been selected. In response, the media guidance application may receive a data structure that includes subscription levels necessary to access the episode of "Game of Thrones."

In some embodiments, the data structure that stores the digital rights required to access the media asset may include a plurality of fields, where each field describes a subscription level required to access the media asset. For example, a data structure for the episode of "Game of Thrones" may include a premium channel subscription as one of the subscription levels included in the data structure. Another subscription level may be just for HBO.

In some embodiments, the media guidance application may, when retrieving, using the user identifier associated with the first user, the first set of digital rights, retrieve a subscription level associated with the first user. For example, the media guidance application may retrieve a basic level, a "Cinemax" subscription level or another suitable subscription level associated with the first user.

In some embodiments, the media guidance application may, when comparing the first set of digital rights with the digital rights required to access the media asset, compare the subscription level associated with the first user with each subscription level required to access the media asset. For example, the media guidance application may iterate through each digital right associated with the user (e.g., one or more subscription levels, or subscription channels) and compare each right with the digital rights required to access the media asset (e.g., a subscription to HBO for a "Game of Thrones" episode).

In some embodiments, the media guidance application may determine that no user has access to the media asset through the service that is currently being accessed, and in response search for another service for access. Specifically, the media guidance application may determine that no set of digital rights of the plurality of sets of digital rights matches the digital rights required to access the media asset, and, in response to determining that no set of digital rights of the plurality of sets of digital rights matches the digital rights required to access the media asset, determine, based on subscriptions associated with each user of the plurality of users, a different media source for accessing the media asset using digital rights associated with one or more users of the plurality of users. For example, the media guidance application may determine that no user from the users consuming media has access to the episode of "Game of Thrones" through the cable service that is being used. In response, the media guidance application may identify a user that has access to HBO GO or another service where the episode of "Game of Thrones" is available and connect to that service in order to consume the episode through that service.

In some embodiments, the media guidance application may receive, in a specific format, a data structure that describes digital rights required to access the media asset. Specifically, the media guidance application may, when retrieving, using the media asset identifier associated with the media asset, digital rights associated with the media asset, receive a media asset data structure where the data structure includes an entry for each user, and where each entry includes a first field that indicates one of a user identifier or a group identifier and a second field that indicates a digital right associated with one of a respective group identifier and user identifier. For example, the media guidance application may receive a data structure that has an entry with a field for a specific media asset identifier (e.g., "Game of Thrones ep. 1 season 2"). The entry may also include one or more subscription levels required to access the media asset. Additionally or alternatively, the entry may include a group identifier for each group (e.g., premium subscription users) that is allowed to access the media asset. In some embodiments, each of these entries may also have a specific digital right field for each group (e.g., view, record, copy, or another suitable right/rights).

In some embodiments, the media guidance application may receive a specific data structure that includes digital rights associated with each user present for media asset consumption. Specifically, the media guidance application may, when retrieving, using the plurality of user identifiers, the plurality of sets of digital rights, retrieve a user data structure that includes an entry for each user of the plurality of users, and where each entry includes a first field indicating a user identifier associated with a respective user, and a second field indicating one or more group identifiers associated with the respective user. For example, the data structure may include an entry for each user with a respective user identifier and one or more fields with one or more subscription levels associated with each user. Additionally or alternatively, a list of groups that each user is a part of can be received as part of the data structure.

In some embodiments, the media guidance application may compare groups that the user is part of with a list of groups that are allowed access to the media asset. Specifically, the media guidance application may, when comparing each set of digital rights of the plurality of sets of digital rights with the digital rights required to access the media asset, compare, for each entry in the user data structure, a user identifier and one or more group identifiers with user identifiers and group identifier in the media asset data structure. For example, if a user has a subscription level of premium, the user may be part of the premium users group. If the media asset is configured with the premium users group, the comparison between those two entities will yield a match, thereby allowing access to that user.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6 is a flowchart of illustrative actions for enabling multiple users' digital rights to be applied as needed to access media while those users are present to consume media, in accordance with some embodiments of the disclosure;

DETAILED DESCRIPTION

Systems and methods are disclosed herein for enabling multiple users' digital rights to be applied as needed to access media while those users are present to consume media. A media guidance application may perform the following actions for enabling multiple users' digital rights to be applied as needed to access media. The media guidance application may receive a selection of a media asset and determine that the user equipment device that is being used in combination with the household/user credentials that are being used to access the media asset do not allow for that access. In response, the media guidance application may identify all the users consuming content from that user equipment device and retrieve digital rights for each user. The media guidance application may compare the digital rights of each user with digital rights required to access the media asset. The media guidance application may, based on the comparison, identify a set of digital rights (e.g., for another user present) that enable access to the media asset, and use those digital rights to access the media asset for consumption.

In some embodiments, the media guidance application may perform the following actions to enable multiple users' digital rights to be applied as needed to access media while those users are present to consume media. The media guidance application may receive user input that identifies a media asset for consumption by a plurality of users that is consuming media content from a first user equipment device, where the first user equipment device is associated with a first user of the plurality of users. For example, a user may browse to a media asset that the group desires to consume and select that media asset to be accessed and played. The media asset may be a scheduled media asset (e.g., broadcast media asset) or an unscheduled media asset (e.g., on-demand media asset).

Figure 1:
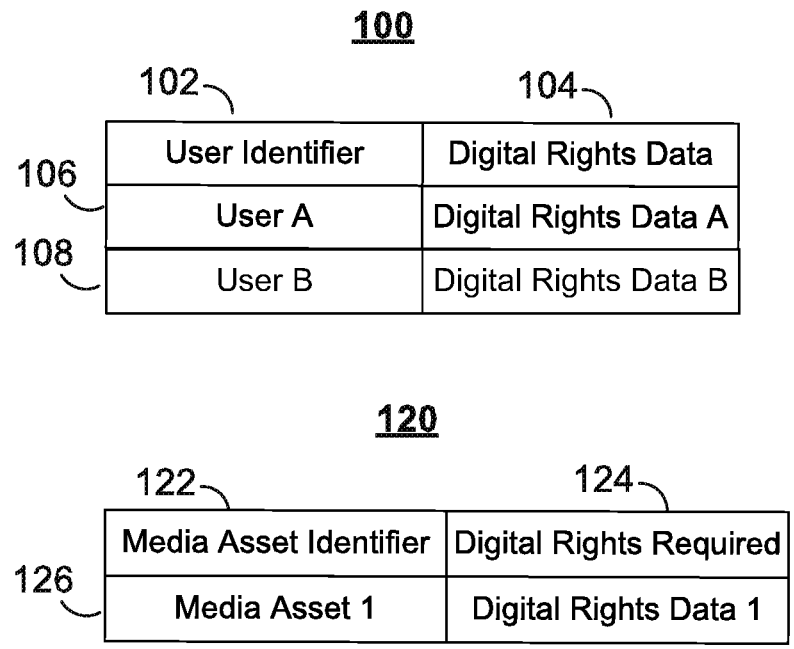
FIG. 1 shows an illustrative example of a data structure for storing digital rights associated with users and a data structure for storing digital rights required for accessing media assets, in accordance with some embodiments of the disclosure.

The media guidance application may identify digital rights needed to access, for example, an episode of "Game of Thrones." Specifically, the media guidance application may retrieve, using a media asset identifier associated with the media asset, digital rights associated with the media asset. For example, the media asset may have digital rights associated with it for different subscription levels. A user with a standard subscription may not be allowed to access the media asset. However, a user with a premium subscription may be allowed to access the media asset. In some embodiments, each media asset may be associated with a list of users and groups that are allowed to access the media asset. The list may also include a type of access that is allowed (e.g., playback, recording, copying, storing locally, and other suitable levels). FIG. 1 illustrates a data structure 120 that includes field types 122 and 124. Field type 122 is for storing media asset identifiers. Media asset identifiers may be stored as a hexadecimal number, an alphanumeric string, a title and release date, or another suitable value.

Field type 124 stores digital rights data for each respective media asset. Digital rights data may include one or more subscription levels required to access the media asset; a list of groups, members of which are allowed to access the media asset; a list of users allowed to access the media asset; and/or another suitable digital right. Entries 106 and 108 may include respective user identifiers (e.g., User A and User B) and respective digital rights data A and digital rights data B. It should be noted that other media asset entries may be included in data structure 100. For example, every media asset may have a similar entry.

The media guidance application may identify digital rights associated with the user. Specifically, the media guidance application may retrieve, using a user identifier associated with the first user, a first set of digital rights, where the first set of digital rights includes digital rights associated with the first user. For example, the user may have a certain subscription level that includes rights to certain media assets or certain channels. Some subscription levels may have more rights than other subscription levels. In some embodiments, the rights associated with the user may be represented with groups that the user is a member of. For example, each media asset may have an associated access list that includes a list of users and groups that have access to the media asset. Furthermore, every user may have an associated list of groups that the user is a member of. FIG. 1 illustrates a data structure 100 that includes field types 102 and 104. Field type 102 may store user identifiers. User identifiers may be stored as a hexadecimal number, an alphanumeric string, an email address or another suitable value. Field type 104 may store digital rights data for each respective user. Digital rights data may include one or more subscription levels that the user is subscribed to, a list of groups that the user is a member of and/or another suitable digital right. Entry 106 may include user identifiers (e.g., User A) and respective digital rights data A. It should be noted that other user entries may be included in data structure 100, for example, every user that has been detected to be consuming media from the user equipment device.

The media guidance application may compare digital rights of the user with digital rights required for the media asset. Specifically, the media guidance application may compare the first set of digital rights with digital rights required to access the media asset. For example, the media guidance application may compare the subscription level associated with the user with a subscription level required to access the media asset. In some embodiments, the media guidance application may compare lists of user identifiers and/or group identifiers associated with the media asset that indicate that the associated user or group is allowed to access the media asset with the user identifier associated with the user and any group identifiers associated with the user, the group identifiers indicating which groups the user is part of. As illustrated by FIG. 1, digital rights data 1 of entry 126 may be compared with digital rights of User A in entry 106.

The media guidance application may determine that the household user/user equipment device does not have the required digital rights to access the media asset. Specifically, the media guidance application may determine, based on comparing the first set of digital rights with the digital rights required to access the media asset, that the first user does not have digital rights to access the media asset. For example, the subscription level associated with the user may be different (e.g., lower) from the subscription level required to view the media asset. For example, the media asset may have an associated list of subscription levels required to access the media asset. However, the user may be associated with a subscription level that does not match a subscription level associated with the media asset.

The media guidance application may take the following actions in response to determining that the first user does not have the digital rights to access the media asset. The media guidance application may identify individuals that are present for consumption of the media asset. Specifically, the media guidance application may determine a plurality of user identifiers, where each user identifier is associated with a respective user of the plurality of users. For example, the media guidance application may use a camera associated with a user equipment device that the media guidance application resides on to identify the users that are located in front of the device. Additionally or alternatively, the media guidance application may detect any mobile devices (e.g., smart phones) that are located within proximity of the user equipment device that the media guidance application resides on. In some embodiments, each user may manually add their login information while consuming media. In yet some embodiments, the users may be identified based on their voice (e.g., the media guidance application may use a microphone to record voice samples and identify users based on the voice samples. It should be noted that other methods of identifying the users may be performed by the media guidance application.

The media guidance application may retrieve digital rights associated with every user that is about to consume the media asset. Specifically, the media guidance application may retrieve, using the plurality of user identifiers, a plurality of sets of digital rights, where each set of the plurality of sets of digital rights describes digital rights for a respective user of the plurality of users. For example, the media guidance application may access data structure 100 and retrieve digital rights associated with entry 106 and 108. It should be noted other user identifiers with corresponding digital rights data may be stored in data structure 100.

The media guidance application may compare user subscription levels with subscription level(s) required to access the media asset. Specifically, the media guidance application may compare each set of digital rights of the plurality of sets of digital rights with the digital rights required to access the media asset. For example, the media guidance application may iterate through each user's digital rights (e.g., of Users A and B of entries 106 and 108 respectively) and compare those digital rights with digital rights required for media asset 1 (e.g., in entry 126).

The media guidance application may identify one of the users that is able to access the media asset. Specifically, the media guidance application may determine, based on comparing each set of digital rights of the plurality of sets of digital rights with the digital rights required to access the media asset, whether a second set of digital rights of the plurality of sets of digital rights matches the digital rights required to access the media asset. For example, the media guidance application may determine that one or more digital rights for User B (entry 108 of FIG. 1) matches one or more digital rights required to access Media Asset 1 (entry 126 of FIG. 1)

If the media guidance application determines that one of the users has access, the media guidance application may access and/or generate for display the media asset. Specifically, the media guidance application may, in response to determining that the second set of digital rights of the plurality of sets of digital rights matches the digital rights required to access the media asset, access the media asset using the first user equipment device with the second set of digital rights. For example, the media guidance application may generate for display the media asset.

In some embodiments, the media guidance application may set a second user as the current user while the media asset is being access/played. Specifically, the media guidance application may set a second user of the plurality of users as a current user, where the second user is associated with the second set of digital rights, and set the first user of the plurality of users as the current user when the media asset has finished playing. For example, the media guidance application may generate an access token for user credentials associated with the second user. In some embodiments, the media guidance application may load the second user's profile into the user equipment device and generate for display an indication that the second user is now the current user. When the media asset stops playing, the media guidance application may unload the second user's profile.

In some embodiments, the media guidance application may retrieve, using the media asset identifier associated with the media asset, the digital rights associated with the media asset by taking the following actions. The media guidance application may transmit, to a remote server, a query for the digital rights associated with the media asset, wherein the query includes a media asset identifier associated with the media asset, and receive from the remote server a data structure that stores the digital rights required to access the media asset. For example, the media guidance application may transmit, to a remote server as part of a query for digital rights, a name of the media asset, the episode number and the season, if the selected media asset is part of a series. In some embodiments, the media guidance application may use a hexadecimal number or an alphanumeric string. In response, the media guidance application may receive a data structure that includes subscription levels necessary to access the media asset.

In some embodiments, the data structure that stores the digital rights required to access the media asset may include a plurality of fields, where each field describes a subscription level required to access the media asset. For example, a data structure 100 illustrates a data structure with field types 122 for media asset identifiers and field types 124 for corresponding digital rights required. Entry 126 represents a sample entry that may store the required media asset identifier and digital rights data.

In some embodiments, the media guidance application may, when retrieving, using the user identifier associated with the first user, the first set of digital rights, retrieve a subscription level associated with the first user. For example, the media guidance application may retrieve a basic subscription level, a premium subscription level, and/or other suitable subscription levels. Additionally or alternatively, the media guidance application may retrieve a subscription level for each network or source.

In some embodiments, the media guidance application may, when comparing the first set of digital rights with the digital rights required to access the media asset, compare the subscription level associated with the first user with each subscription level required to access the media asset. For example, the media guidance application may iterate through each digital right associated with the user (e.g., one or more subscription levels, or subscription channels) and compare each right with the digital rights required to access media asset.

In some embodiments, the media guidance application may determine that no user has access to the media asset through the service that is currently being accessed, and in response search for another service for access. Specifically, the media guidance application may determine that no set of digital rights of the plurality of sets of digital rights matches the digital rights required to access the media asset, and in response to determining that no set of digital rights of the plurality of sets of digital rights matches the digital rights required to access the media asset, determine, based on subscriptions associated with each user of the plurality of users, a different media source for accessing the media asset using digital rights associated with one or more users of the plurality of users. For example, the media guidance application may determine, based on iterating through all the digital rights, that no user from the users consuming media has access to the selected media asset through the cable service that is being used. In response, the media guidance application may determine from which other services the media asset is available and compare those services with each user's digital rights to access the media asset from those services. If a match is found, the media guidance application may use one of those sources to access the media asset.

In some embodiments, the media guidance application may receive, in a specific format, a data structure that describes digital rights required to access the media asset. Specifically, the media guidance application may, when retrieving, using the media asset identifier associated with the media asset, digital rights associated with the media asset, receive a media asset data structure where the data structure includes an entry for each user, and where each entry includes a first field that indicates one of a user identifier or a group identifier and a second field that indicates a digital right associated with one of a respective group identifier and user identifier. For example, the media guidance application may receive data structure data structure 120 with field types 122 and 124. The entry may also include one or more subscription levels required to access the media asset. Additionally or alternatively, the entry may include a group identifier each for a group (e.g., premium subscription users) that is allowed to access the media asset. In some embodiments, each of these entries may also have a specific digital right field for each group (e.g., view, record, copy, or another suitable right/rights).

In some embodiments, the media guidance application may receive a specific data structure that includes digital rights associated with each user present for media asset consumption. Specifically, the media guidance application may, when retrieving, using the plurality of user identifiers, the plurality of sets of digital rights, retrieve a user data structure that includes an entry for each user of the plurality of users, and where each entry includes a first field indicating a user identifier associated with a respective user, and a second field indicating one or more group identifiers associated with the respective user. For example, the data structure may include an entry for each user with a respective user identifier and one or more fields with one or more subscription level associated with each user. For example, data structure 100 may be received by the media guidance application with field types 102 and 104, and user entries 106 and 108. Additionally or alternatively, a list of groups that each user is a part of can be received as part of the data structure.

In some embodiments, the media guidance application may compare groups that the user is part of with a list of groups that are allowed access to the media asset. Specifically, the media guidance application may, when comparing each set of digital rights of the plurality of sets of digital rights with the digital rights required to access the media asset, compare, for each entry in the user data structure, a user identifier and one or more group identifiers with user identifiers and group identifier in the media asset data structure. For example, if a user has a subscription level of premium, the user may be part of the premium users group. If the media asset is configured with the premium users group, the comparison between those two entities will yield a match, thereby allowing access to that user.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
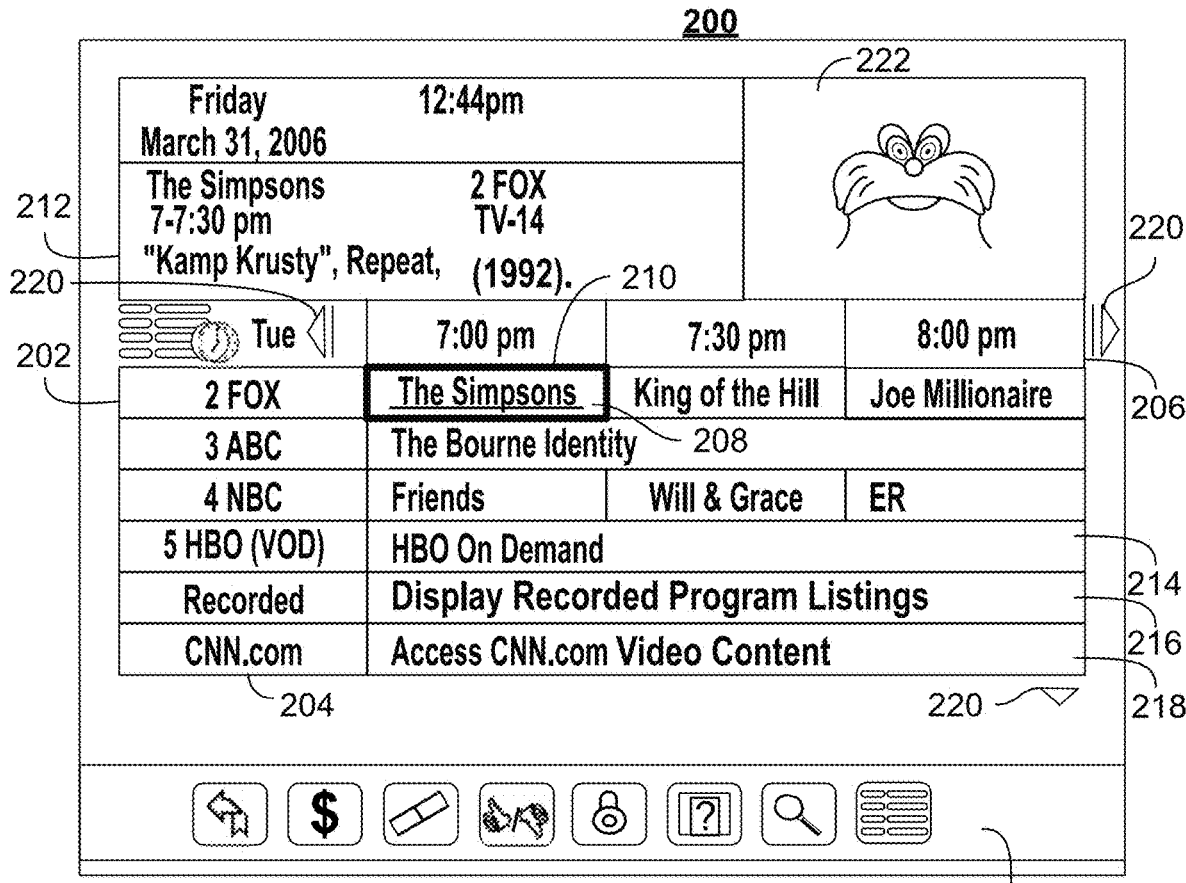
FIG. 2 shows an illustrative example of a display screen for use in accessing media content in accordance with some embodiments of the disclosure.
Figure 3:
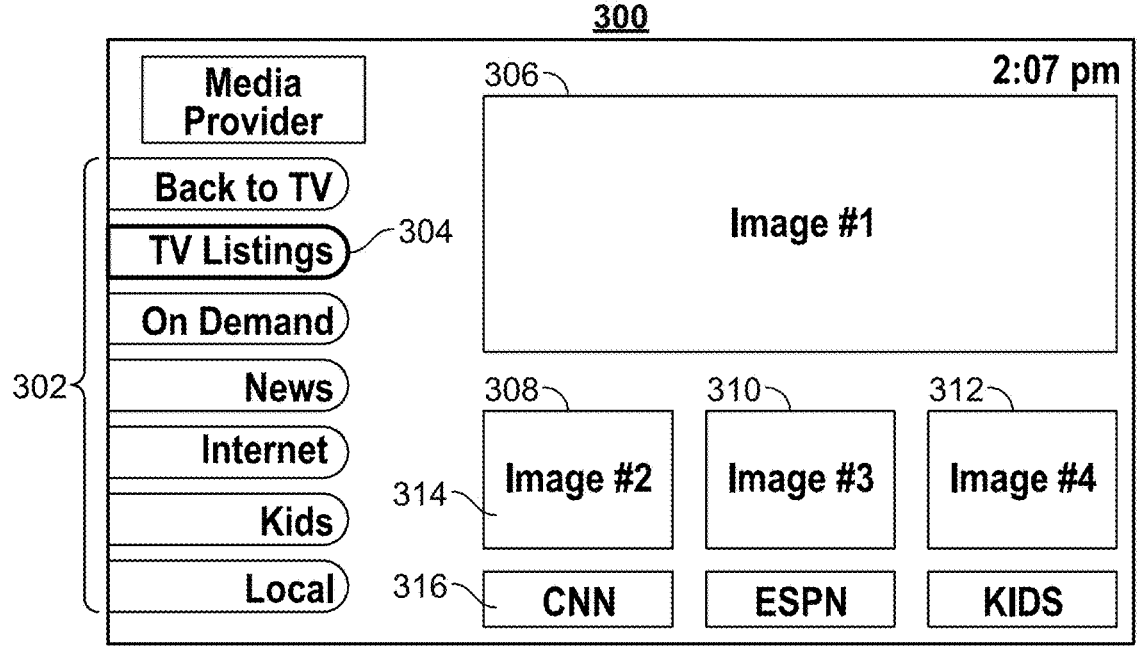
FIG. 3 shows another illustrative example of a display screen for use in accessing media content in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 224. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 224 may allow the user to access different types of content, media guidance application displays, and/or media guidance application features. Options region 224 may be part of display 200 (and other display screens described herein), or may be invoked by a user by selecting an on-screen option or pressing a dedicated or assignable button on a user input device. The selectable options within options region 224 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
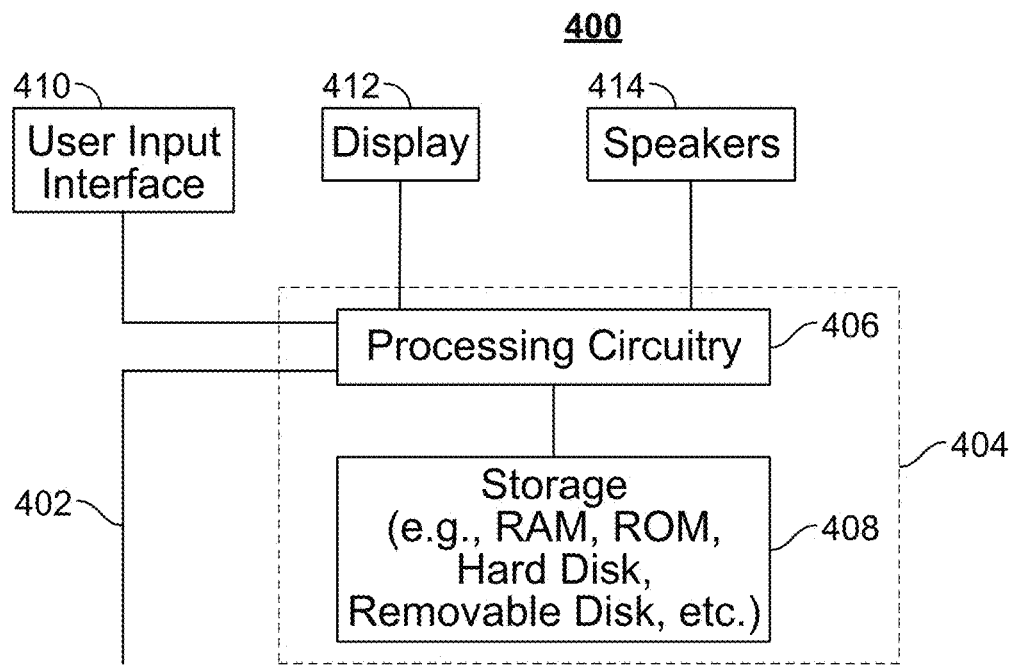
FIG. 4 is a block diagram of an illustrative user equipment device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
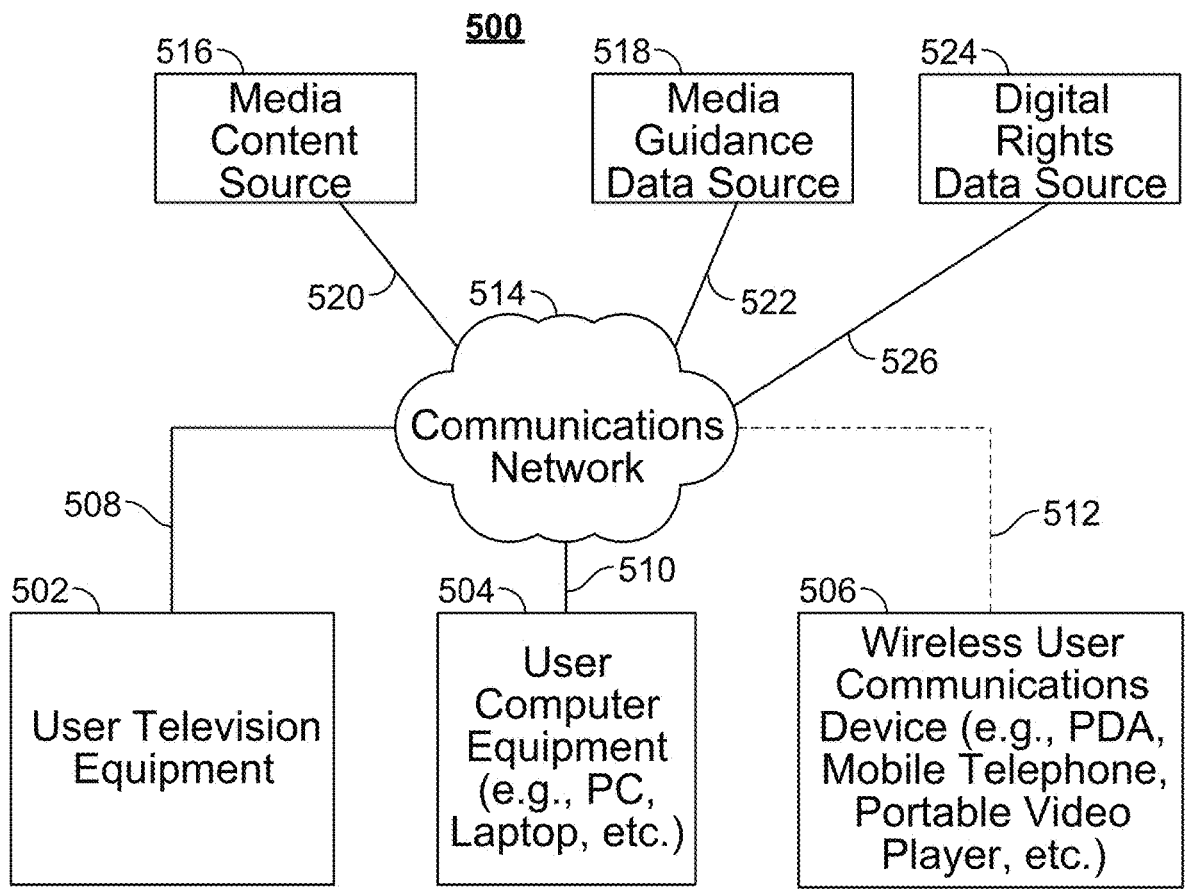
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

FIG. 6 is a flowchart of illustrative actions for enabling multiple users' digital rights to be applied as needed to access media while those users are present to consume media. At 602, control circuitry 404 receives user input that identifies a media asset for consumption by a plurality of users that is consuming media content from a first user equipment device, where the first user equipment device is associated with a first user of the plurality of users. For example, the control circuitry may receive the user input via user input interface 410.

At 604, control circuitry 404 determines, based on a first set of digital rights associated with the first user, that the first user does not have digital rights to access the media asset. For example, the control circuitry may retrieve the first set of digital rights associated with the first user from storage 408. In some embodiments, the control circuitry may retrieve the digital rights associated with the first user from a remote server (e.g., a remote server associated with media content source 516 and/or media guidance data source 518). The control circuitry may retrieve the rights required to access the media asset from storage 408. In some embodiments, the control circuitry may retrieve the digital rights required to access the media asset from a remote server (e.g., a remote server associated with media content source 516 and/or media guidance data source 518). In yet some embodiments, the control circuitry may retrieve the rights from a service specifically designed for that function (e.g., digital rights data source 524). Digital Rights Data Source 524 may include one or more servers designated for storing users' digital rights information. The digital rights data source may be connected to communications network 514 via link 526. The control circuitry may compare the rights required with the rights associated with the first user in order to determine whether the first user has digital rights to access the media asset.

At 606, in response to determining that the first user does not have the digital rights to access the media asset, control circuitry 404 performs the following actions. At 608, control circuitry 404 determines a plurality of sets of digital rights, where each set of the plurality of sets of digital rights describes digital rights for a respective user of the plurality of users. For example, the control circuitry may retrieve the digital rights associated with each user from storage 408. In some embodiments, the control circuitry may retrieve the digital rights associated each user from a remote server (e.g., a remote server associated with media content source 516 and/or media guidance data source 518). In yet some embodiments, the control circuitry may transmit a query to a digital rights data source (e.g., digital rights data source 524) for one or more users' digital rights. The control circuitry may receive in response to the query a data structure that includes the users' digital rights. It should be noted that the control circuitry perform the action with respect to users that are currently present and are consuming media content together.

At 610, control circuitry 404 compares each set of digital rights of the plurality of sets of digital rights with digital rights required to access the media asset. For example, the control circuitry may iterate through each set of digital rights and determine whether one or more of the sets matches the digital rights required to access the media asset. At 612, control circuitry 404 identifies, based on the comparing, a second user of the plurality of users with a second set of digital rights of the plurality of sets of digital rights that matches the digital rights required to access the media asset. For example, as the control circuitry iterates through each set of digital rights, the control circuitry may determine that a specific set of digital rights includes a digital right that matches a digital right required to access the media asset.

At 614, control circuitry 404 accesses the media asset using the first user equipment device with the second set of digital rights associated with the second user. For example, the control circuitry may access the media asset in storage 408. In some embodiments, the control circuitry may access the media asset from a remote server (e.g., a server associated with media content source 516 and/or media guidance data source 518). The control circuitry may access the media asset via communications network 514.

Figure 7:
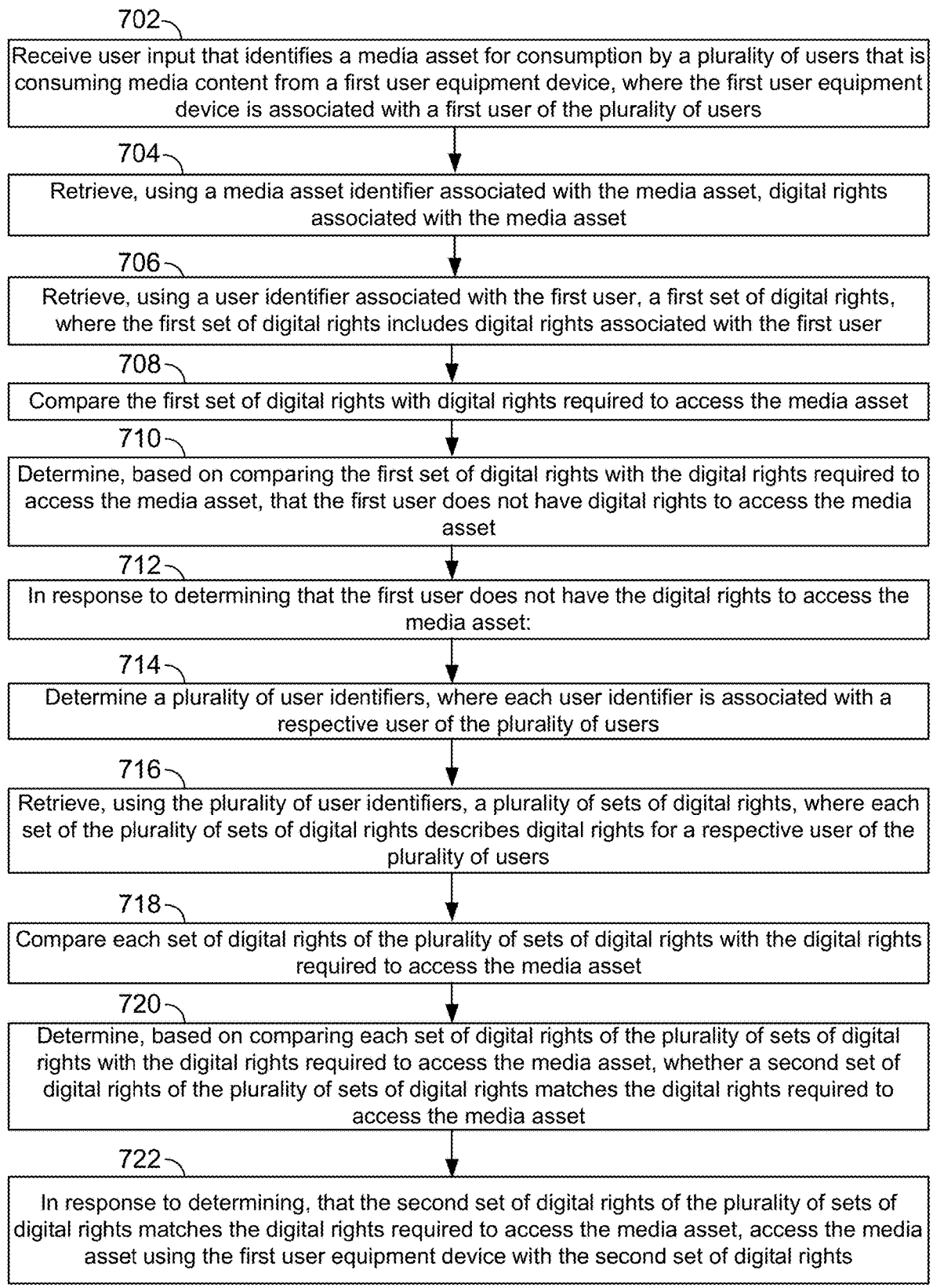
FIG. 7 is another flowchart of illustrative actions for enabling multiple users' digital rights to be applied as needed to access media while those users are present to consume media, in accordance with some embodiments of the disclosure.

FIG. 7 is another flowchart of illustrative actions for enabling multiple users' digital rights to be applied as needed to access media while those users are present to consume media. At 702, control circuitry 404 receives user input that identifies a media asset for consumption by a plurality of users that is consuming media content from a first user equipment device, where the first user equipment device is associated with a first user of the plurality of users. For example, the control circuitry may receive the user input via user input interface 410.

At 704, control circuitry 404 retrieves, using a media asset identifier associated with the media asset, digital rights associated with the media asset. The control circuitry may retrieve the media asset identifier from storage 408. In some embodiments, the control circuitry may generate a query for digital rights associated with the media asset, where the query may include the media asset identifier. The control circuitry may transmit the query (e.g., via I/O path 402) to a remote server (e.g., a remote server associated with media content source 516 and/or media guidance data source 518). The control circuitry may transmit the query over communications network 514. In response, the control circuitry may receive digital rights associated with the media asset (i.e., digital rights required to access the media asset).

At 706, control circuitry 404 retrieves, using a user identifier associated with the first user, a first set of digital rights, where the first set of digital rights includes digital rights associated with the first user. The control circuitry may retrieve the digital rights associated with the user from storage 408. In some embodiments, the control circuitry may generate a query for digital rights associated with the user and include the user identifier in the query. The control circuitry may transmit the query to a remote server (e.g., a remote server associated with media content source 516 and/or media guidance data source 518). The control circuitry may perform the transmission over communications network 514. The control circuitry may receive, in response, a data structure that includes digital rights associated with the first user.

At 708, control circuitry 404 compares the first set of digital rights with digital rights required to access the media asset. For example, the control circuitry may iterate through each digital right in the first set with each digital right that allows access to the media asset. At 710, control circuitry 404 determines, based on comparing the first set of digital rights with the digital rights required to access the media asset, that the first user does not have digital rights to access the media asset. For example, the control circuitry may determine that no digital right associated with the user matches a digital right associated with the media asset (i.e., a digital right that allows access to the media asset).

At 712, control circuitry 404, in response to determining that the first user does not have the digital rights to access the media asset, performs the following actions. At 714, control circuitry 404 determines a plurality of user identifiers, where each user identifier is associated with a respective user of the plurality of users. For example, a device where a control circuitry resides (e.g., user television equipment 502, user computer equipment 504 and/or wireless communications device 506) may include a camera and/or a microphone. The camera may identify each user present using face recognition. Additionally or alternatively, a microphone may pick up people's voices and identify users in that manner. It should be noted that the control circuitry perform the action with respect to users that are currently present and are consuming media content together.

At 716, control circuitry 404 retrieves, using the plurality of user identifiers, a plurality of sets of digital rights, where each set of the plurality of sets of digital rights describes digital rights for a respective user of the plurality of users. For example, control circuitry 404 may retrieve each set of digital rights from storage 408. In some embodiments, the control circuitry may retrieve some or all of the sets of digital rights from a remote server (e.g., a server associated with media content source 516 and/or media guidance data source 518). In some embodiments, the first user's digital rights may reside in storage 408 while digital rights of the user's guest may reside at a remote server. The control circuitry may transmit a query with each user identifier for each user to receive back the digital rights associated with each user.

At 718, control circuitry 404 compares each set of digital rights of the plurality of sets of digital rights with the digital rights required to access the media asset. For example, control circuitry 404 may iterate through each set of digital rights and compare each digital right within the set of digital rights with each digital right associated with the media asset (i.e., each digital right that allows accessing the media asset). At 720, control circuitry 404 determines, based on comparing each set of digital rights of the plurality of sets of digital rights with the digital rights required to access the media asset, whether a second set of digital rights of the plurality of sets of digital rights matches the digital rights required to access the media asset. For example, if a digital right in one or more sets of digital rights matches a digital right associated with the user, control circuitry 404 may determine that access to the media asset should be allowed.

At 722, control circuitry 404, in response to determining that the second set of digital rights of the plurality of sets of digital rights matches the digital rights required to access the media asset, accesses the media asset using the first user equipment device with the second set of digital rights. For example, control circuitry 404 may generate for display the media asset on display 412 and/or speakers 414.

Figure 8:
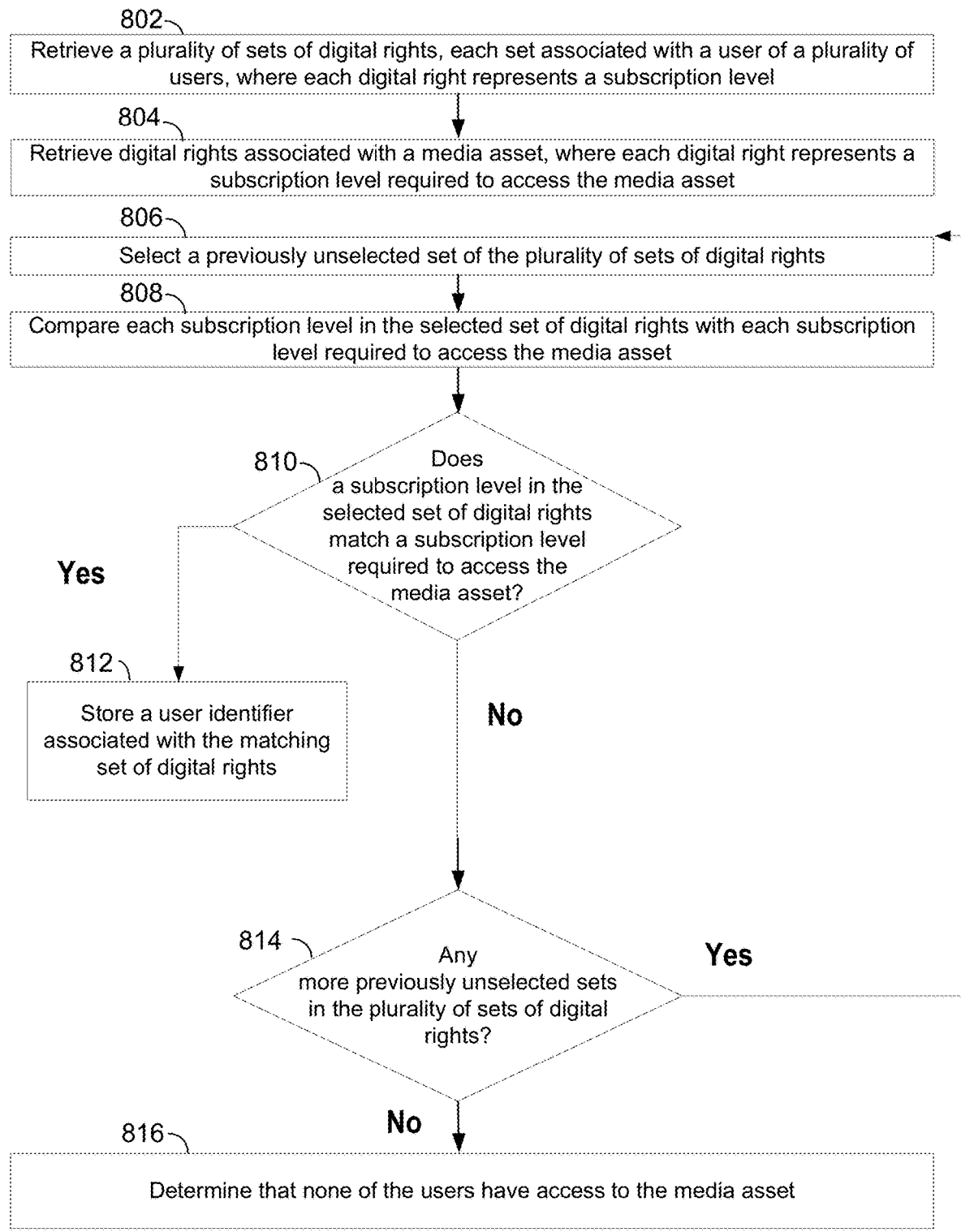
FIG. 8 is a flowchart of illustrative actions for determining whether any user of the plurality of users is associated with a subscription level required to access the media asset, in accordance with some embodiments of the disclosure.

FIG. 8 is a flowchart of illustrative actions for determining whether any user of the plurality of users is associated with a subscription level required to access the media asset. At 802, control circuitry 404 retrieves a plurality of sets of digital rights, each set associated with a user of a plurality of users, where each digital right represents a subscription level. For example, the control circuitry may retrieve one or more subscription levels associated with each user of the plurality of users. The control circuitry may retrieve the subscription level information from storage 408. In some embodiments, the control circuitry may retrieve the sets of digital rights from a remote server.

At 804, control circuitry 404 retrieves digital rights associated with a media asset, where each digital right represents a subscription level required to access the media asset. For example, control circuitry 404 may retrieve the digital rights associated with the media asset in a manner similar to retrieving the digital rights associated with each user. At 806, control circuitry 404 selects a previously unselected set of the plurality of sets of digital rights. For example, the control circuitry may iterate through each set of digital rights (e.g., each set of subscription levels). At 808, control circuitry 404 compares each subscription level in the selected set of digital rights with each subscription level required to access the media asset. For example, the control circuitry may do a textual comparison of the subscription levels.

At 810, control circuitry 404 determines whether a subscription level in the selected set of digital rights matches a subscription level required to access the media asset. If control circuitry 404 determines that a subscription level in the selected set of digital rights matches a subscription level required to access the media asset, process 800 moves to 812, where control circuitry 404 stores a user identifier associated with the matching set of digital rights. The control circuitry may store the user identifier in storage 408. If control circuitry 404 determines that a subscription level in the selected set of digital rights does not match a subscription level required to access the media asset, process 800 moves to 814.

At 814, control circuitry 404 determines whether there are more previously unselected sets in the plurality of sets of digital rights. If control circuitry 404 determines that there are more previously unselected sets in the plurality of sets of digital rights, process 800 moves to action 806, where a next set is selected for processing. If the control circuitry determines that there are no more previously unselected sets in the plurality of sets of digital rights, process 800 moves to action 816, where the control circuitry determines that none of the users has access to the media asset.

Figure 9:
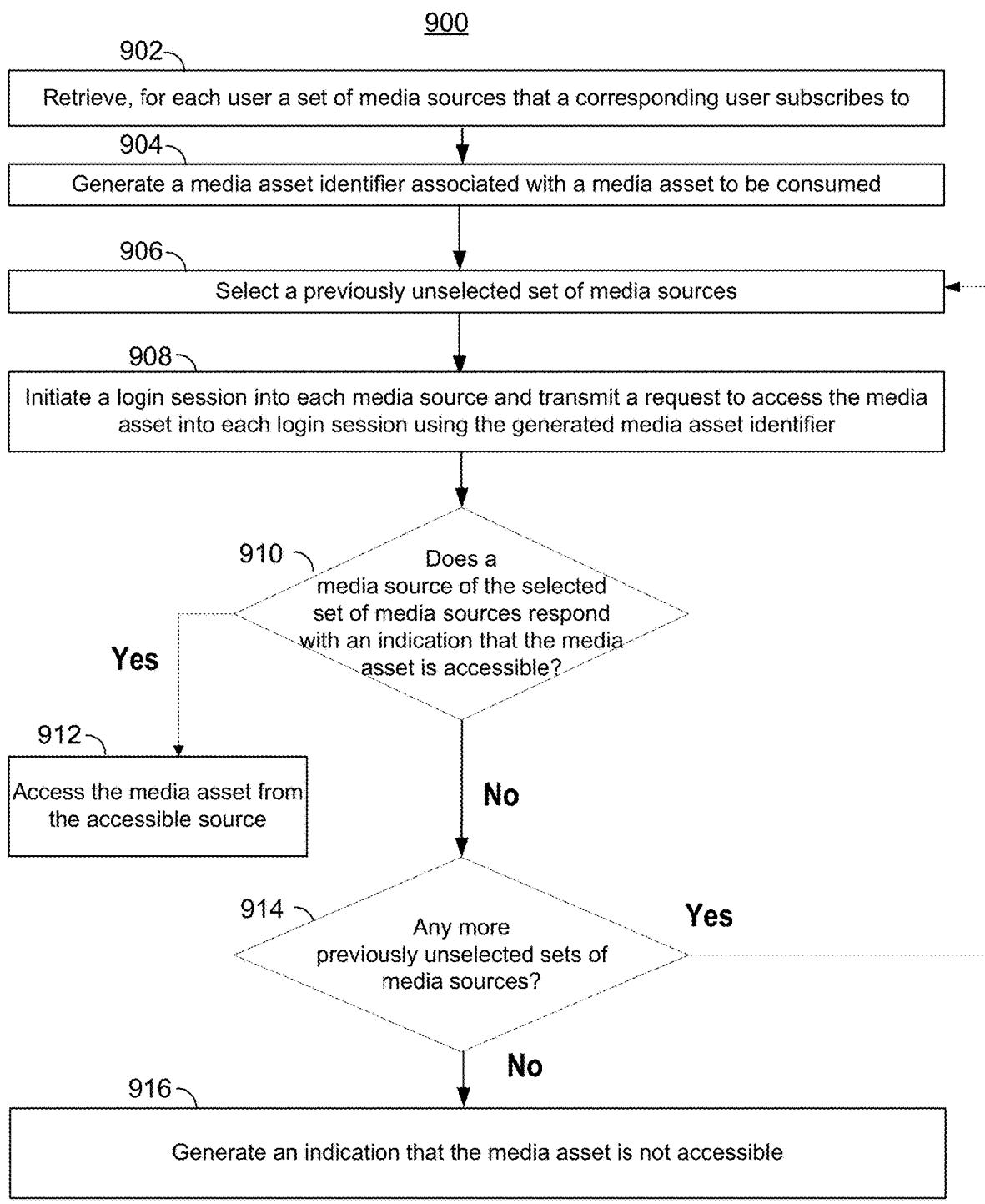
FIG. 9 is a flowchart of illustrative actions for searching for a media asset to access from a different source using subscriptions of users present, in accordance with some embodiments of the disclosure.

FIG. 9 is a flowchart of illustrative actions for searching for a media asset to access from a different source using subscriptions of users present. At 902, control circuitry 404 retrieves, for each user, a set of media sources that a corresponding user subscribes to. For example, the control circuitry may access a server that hosts a plurality of user profiles and retrieve from that server known user subscriptions. At 904, control circuitry 404 generates a media asset identifier associated with a media asset to be consumed. For example, the control circuitry may generate an identifier that includes the title and release date of a media asset. For a media asset in a series, the media guidance application may generate an identifier that includes, title, season number, and episode number.

At 906, control circuitry 404 selects a previously unselected set of media sources. For example, control circuitry 404 may iterate through each set of media sources that was retrieved. At 908, control circuitry 404 initiates a login session into each media source and transmits a request to access the media asset into each login session using the generated media asset identifier. For example, the control circuitry may attempt to log in to each media source accessible to the user whose media source subscriptions are being processed. At 910, control circuitry 404 determines whether a media source of the selected set of media sources responds with an indication that the media asset is accessible. If control circuitry 404 determines that a media source of the selected set of media sources responds with an indication that the media asset is accessible, process 900 moves to 912, where control circuitry 404 accesses the media asset from the accessible source. If control circuitry 404 determines that no media source of the selected set of media sources responds with an indication that the media asset is accessible, process 900 moves to 914.

At 914, control circuitry 404 determines whether there are any more previously unselected sets of media sources. If control circuitry 404 determines that there are more previously unselected sets of media sources, process 900 moves to 906, where a new previously unselected set of media sources is selected for processing (i.e., another user is selected for subscription analysis). If control circuitry 404 determines that there are no more previously unselected sets of media assets available, process 900 moves to 916. At 916, control circuitry 404 generates an indication that the media asset is not accessible. For example, the control circuitry may generate for display (e.g., on display 412) an indication that the media asset is not accessible.

The processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    receiving a request to access a content item from a first media source via a first device at a first physical position;
    retrieving a first set of digital rights data corresponding to the first device;
    determining that the first set of digital rights data does not authorize access to the content item from the first media source;
    based at least in part on determining that the first set of digital rights data does not authorize access to the content item from the first media source, identifying a second device at a second physical position proximate to the first physical position of the first device;
    receiving a second set of digital rights data corresponding to the second device based at least in part on having identified the second device as being proximate to the first device;
    determining that the second set of digital rights data does not authorize access to the content item from the first media source;
    based at least in part on determining that the second set of digital rights data does not authorize access to the content item from the first media source, determining that the second set of digital rights data authorizes access to the content item from a second media source that is different from the first media source; and
    accessing the content item from the second media source using the second set of digital rights data.

2. The method of claim 1, wherein the first device is associated with a first account associated with the first media source and the second device is associated with a second account associated with the second media source, and wherein the first account is distinct from the second account.

3. The method of claim 2, wherein accessing the content item from the second media source using the second set of digital rights data comprises:
    setting the second account as a currently selected account and setting the second media source as a currently selected media source to access the content item using the second set of digital rights data for duration of consumption of the content item; and
    after the consumption of the content item has finished, setting the currently selected account to be the first account and the currently selected media source to be the first media source.

4. The method of claim 1, wherein identifying the second device at the second physical position proximate to the first physical position of the first device comprises:
    detecting a plurality of devices that are located at respective physical positions within proximity of the first physical position of the first device;
    determining a plurality of user identifiers corresponding to the plurality of devices; and
    identifying, based on the plurality of user identifiers, the second set of digital rights data.

5. The method of claim 1, wherein the determining that the first device is not authorized to access the content item comprises:
    determining a content identifier associated with the content item;
    retrieving, using the content identifier, digital rights data required to access the content item; and
    comparing the first set of digital rights data with the digital rights data required to access the content item.

6. The method of claim 5, wherein the comparing the first set of digital rights data with the digital rights data required to access the content item comprises comparing a subscription level corresponding to the first set of digital rights data with a subscription level corresponding to the digital rights data required to access the content item.

7. The method of claim 1, wherein the retrieving the first set of digital rights data comprises:
    transmitting a query for the first set of digital rights data, wherein the query comprises a user identifier associated with a first account associated with the first media source; and
    based on the query, receiving a data structure that stores the first set of digital rights data.

8. The method of claim 1, wherein the first set of digital rights data corresponding to the first device is retained after the content item has finished playing.

9. The method of claim 1, further comprising:
    identifying a third device at a third physical position proximate to the first physical position of the first device and the second physical position of the second device;
    receiving a third set of digital rights data corresponding to the third device based at least in part on having identified the third device as being proximate to the first device and the second device; and
    determining that the third set of digital rights data does not authorize access to the content item from the first media source,
    wherein performing the determination that the second set of digital rights data authorizes access to the content item from the second media source is further based at least in part on determining that the third set of digital rights data does not authorize access to the content item from the first media source.

10. A system comprising:
    communications circuitry configured to receive a request to access a content item from a first media source via a first device at a first physical position; and
    control circuitry coupled to the communications circuitry, wherein the control circuitry is configured to:
    retrieve a first set of digital rights data corresponding to the first device;

determine that the first set of digital rights data does not authorize access to the content item from the first media source;

based at least in part on determining that the first set of digital rights data does not authorize access to the content item from the first media source, identify a second device at a second physical position proximate to the first physical position of the first device;

receive, via the communications circuitry, a second set of digital rights data from the second device based at least in part on having identified the second device as being proximate to the first device;

determine that the second set of digital rights data does not authorize access to the content item from the first media source;

based at least in part on determining that the second set of digital rights data does not authorize access to the content item from the first media source, determine that the second set of digital rights data authorizes access to the content item from a second media source that is different from the first media source; and access the content item from the second media source using the second set of digital rights data.

11. The system of claim 10, wherein the first device is associated with a first account associated with the first media source and the second device is associated with a second account associated with the second media source, and wherein the first account is distinct from the second account.

12. The system of claim 11, wherein the control circuitry is configured to access the content item from the second media source using the second set of digital rights data by:
setting the second account as a currently selected account and setting the second media source as a currently selected media source to access the content item using the second set of digital rights data for duration of consumption of the content item; and
after the consumption of the content item has finished, setting the currently selected account to be the first account and the currently selected media source to be the first media source.

13. The system of claim 10, wherein the control circuitry is configured to identify the second device at the second physical position proximate to the first physical position of the first device by:
detecting a plurality of devices that are located at respective physical positions within proximity of the first physical position of the first device;
determining a plurality of user identifiers corresponding to the plurality of devices; and
identifying, based on the plurality of user identifiers, the second set of digital rights data.

14. The system of claim 10, wherein the control circuitry is configured to determine that the first device is not authorized to access the content item by:
determining a content identifier associated with the content item;
retrieving, using the content identifier, digital rights data required to access the content item; and
comparing the first set of digital rights data with the digital rights data required to access the content item, wherein the comparing comprises comparing a subscription level corresponding to the first set of digital rights data with a subscription level corresponding to the digital rights data required to access the content item.

15. The system of claim 10, wherein the control circuitry is configured to retrieve the first set of digital rights data by:
transmitting a query for the first set of digital rights data, wherein the query comprises a user identifier associated with a first account associated with the first media source; and
based on the query, receiving a data structure that stores the first set of digital rights data.

16. A non-transitory computer readable medium comprising one or more instructions that, when executed by control circuitry, cause the control circuitry to:
receive a request to access a content item from a first media source via a first device at a first physical position;
retrieve a first set of digital rights data corresponding to the first device;
determine that the first set of digital rights data does not authorize access to the content item from the first media source;
based at least in part on determining that the first set of digital rights data does not authorize access to the content item from the first media source, identify a second device at a second physical position proximate to the first physical position of the first device;
receive a second set of digital rights data from the second device;
determine that the second set of digital rights data does not authorize access to the content item from the first media source;
based at least in part on determining that the second set of digital rights data does not authorize access to the content item from the first media source, determine that the second set of digital rights data authorizes access to the content item from a second media source that is different from the first media source; and
access the content item from the second media source using the second set of digital rights data.

17. The non-transitory computer readable medium of claim 16, wherein the first device is associated with a first account associated with the first media source and the second device is associated with a second account associated with the second media source, and wherein the first account is distinct from the second account.

18. The non-transitory computer readable medium of claim 17, wherein the instructions that cause the control circuitry to access the content item from the second media source using the second set of digital rights data cause the control circuitry to:
set the second account as a currently selected account and set the second media source as a currently selected media source to access the content item using the second set of digital rights data for duration of consumption of the content item; and
after the consumption of the content item has finished, set the currently selected account to be the first account and the currently selected media source to be the first media source.

19. The non-transitory computer readable medium of claim 16, wherein the instructions that cause the control circuitry to identify the second device at the second physical position proximate to the first physical position of the first device cause the control circuitry to:
detect a plurality of devices that are located at respective physical positions within proximity of the first physical position of the first device;
determine a plurality of user identifiers corresponding to the plurality of devices; and identify, based on the plurality of user identifiers, the second set of digital rights data.

20. The non-transitory computer readable medium of claim 16, wherein the instructions that cause the control circuitry to determine that the first device is not authorized to access the content item cause the control circuitry to:
- determine a content identifier associated with the content item;
- retrieve, using the content identifier, digital rights data required to access the content item; and
- compare the first set of digital rights data with the digital rights data required to access the content item.

* * * * *